US009522976B2

(12) United States Patent
Tabor et al.

(10) Patent No.: US 9,522,976 B2
(45) Date of Patent: Dec. 20, 2016

(54) CYCLOALIPHATIC POLYESTER POLYOLS FROM THERMOPLASTIC POLYESTERS

(71) Applicant: RESINATE MATERIALS GROUP, INC., Plymouth, MI (US)

(72) Inventors: Rick Tabor, Plymouth, MI (US); Eric David Vrabel, Ferndale, MI (US); Matthew Beatty, Ann Arbor, MI (US)

(73) Assignee: RESINATE MATERIALS GROUP, INC., Plymouth, MI (US)

( * ) Notice: Subject to any disclaimer, the term of this patent is extended or adjusted under 35 U.S.C. 154(b) by 0 days.

(21) Appl. No.: 15/083,491

(22) Filed: Mar. 29, 2016

(65) Prior Publication Data
US 2016/0272756 A1 Sep. 22, 2016

Related U.S. Application Data

(63) Continuation of application No. PCT/US2016/021437, filed on Mar. 9, 2016.

(60) Provisional application No. 62/136,296, filed on Mar. 20, 2015.

(51) Int. Cl.
C08G 18/42 (2006.01)
C08G 63/91 (2006.01)
C09D 175/06 (2006.01)

(52) U.S. Cl.
CPC ......... C08G 63/916 (2013.01); C08G 18/4238 (2013.01); C09D 175/06 (2013.01)

(58) Field of Classification Search
CPC .. C08G 18/4238; C08G 63/916; C09D 175/06
See application file for complete search history.

(56) References Cited

U.S. PATENT DOCUMENTS

| | | | |
|---|---|---|---|
| 2,793,220 A | 5/1957 | Barrett et al. | |
| 3,487,100 A | 12/1969 | Arai et al. | |
| 3,501,420 A | 3/1970 | Stevenson | |
| 4,079,028 A | 3/1978 | Emmons et al. | |
| 4,155,892 A | 5/1979 | Emmons et al. | |
| 4,371,469 A | 2/1983 | Foglia et al. | |
| 4,439,546 A | 3/1984 | Brennan et al. | |
| 4,469,823 A | 9/1984 | Yeakey et al. | |
| 4,506,090 A | 3/1985 | Brennan et al. | |
| 4,897,429 A | 1/1990 | Trowell et al. | |
| 5,075,417 A | 12/1991 | Trowell et al. | |
| 5,138,027 A | 8/1992 | Van Beek | |
| 5,155,163 A | 10/1992 | Abeywardena et al. | |
| 5,281,654 A | 1/1994 | Eisenhart et al. | |
| 5,468,802 A | 11/1995 | Wilt et al. | |
| 5,502,247 A | 3/1996 | Bartos et al. | |
| 5,574,127 A | 11/1996 | Sau | |
| 5,608,000 A | 3/1997 | Duan et al. | |
| 5,703,198 A * | 12/1997 | Twigt | C09D 4/06 427/355 |
| 5,763,526 A | 6/1998 | Harakawa et al. | |
| 5,922,779 A | 7/1999 | Hickey | |
| 6,281,373 B1 | 8/2001 | Sato et al. | |
| 6,337,366 B1 | 1/2002 | Amick et al. | |
| 6,339,125 B1 | 1/2002 | Bechara et al. | |
| 6,359,022 B1 | 3/2002 | Hickey et al. | |
| 6,429,233 B1 | 8/2002 | Oguri et al. | |
| 6,538,059 B1 * | 3/2003 | Muller | C08F 2/24 524/507 |
| 6,630,601 B1 | 10/2003 | Inada et al. | |
| 6,635,723 B1 | 10/2003 | Maier et al. | |
| 6,642,350 B1 | 11/2003 | Asakawa et al. | |
| 6,664,363 B1 | 12/2003 | Faunce | |
| 6,762,276 B2 | 7/2004 | Sumner, Jr. et al. | |
| 7,045,573 B2 | 5/2006 | Mayer et al. | |
| 7,192,988 B2 | 3/2007 | Smith et al. | |
| 7,342,068 B2 | 3/2008 | Klingenberg et al. | |
| 8,334,357 B2 | 12/2012 | Schieferstein et al. | |
| 8,410,318 B2 | 4/2013 | Barton et al. | |
| 8,461,213 B2 | 6/2013 | Munzenberg et al. | |

(Continued)

FOREIGN PATENT DOCUMENTS

| | | |
|---|---|---|
| CA | 104511 A | 4/1907 |
| WO | 96/34924 A1 | 11/1996 |

(Continued)

OTHER PUBLICATIONS

PCT International Search Report and Written Opinion dated Jun. 13, 2016 from corresponding Application No. PCT/US2016/021437, 13 pages.
Paszun, D. et al: "Chemical Recycling of Poly(ethylene terephthalate)", Ind. Eng. Chem. Res., vol. 36, No. 4, 1997, pp. 1373-1383.
Ikladious, N.: "Recycling of Polyl(ethylene terephthalate): Identification of Glycolysis Products",J. Elast. Plast. 32 (2000), pp. 140-151.

(Continued)

Primary Examiner — Patrick Niland
(74) Attorney, Agent, or Firm — Dilworth IP LLC

(57) ABSTRACT

Cycloaliphatic polyester polyols and processes for making them from thermoplastic polyesters are disclosed. One process comprises heating a thermoplastic polyester with a glycol to give a digested intermediate and hydrogenating aromatic rings in the digested intermediate to produce the cycloaliphatic polyester polyol. Optionally, the digested intermediate is reacted with a hydrophobe to give a modified polyol prior to hydrogenation, and the modified polyol is hydrogenated to give the cycloaliphatic polyester polyol. The high-recycle-content cycloaliphatic polyester polyols have desirable attributes for formulating polyurethane dispersions, two-component polyurethane coatings, mono- or poly(meth)acrylates, polyisocyanurates, flexible and rigid foams, coatings, adhesives, sealants, and elastomers, and they provide a sustainable alternative to petrochemical-based polyols.

27 Claims, No Drawings

(56) References Cited

U.S. PATENT DOCUMENTS

| | | |
|---|---|---|
| 8,524,649 B2 | 9/2013 | Leyrer et al. |
| 8,673,275 B2 | 3/2014 | Kim et al. |
| 8,697,797 B2 | 4/2014 | Suau et al. |
| 8,871,817 B2 | 10/2014 | Turk et al. |
| 2009/0131625 A1 | 5/2009 | Kurian et al. |
| 2013/0041053 A1 | 2/2013 | Pecorini et al. |
| 2013/0197269 A1 | 8/2013 | Yoshimura et al. |
| 2013/0197270 A1 | 8/2013 | Yoshimura et al. |

FOREIGN PATENT DOCUMENTS

| | | |
|---|---|---|
| WO | 00/75252 A1 | 12/2000 |
| WO | 2012/036699 A1 | 3/2012 |
| WO | 2013109834 A1 | 7/2013 |
| WO | 2013154874 A1 | 10/2013 |
| WO | 2014093995 A1 | 6/2014 |

OTHER PUBLICATIONS

Troev, K. et al: "A Novel Catalyst for the Glycolysis of Poly(ethylene terephthalate)", J. Appl. Polym. Sci., 90 (2003), pp. 1148-1152.

March's Advanced Organic Chemistry, 5th Ed., pp. 1002-1010.

\* cited by examiner

US 9,522,976 B2

CYCLOALIPHATIC POLYESTER POLYOLS FROM THERMOPLASTIC POLYESTERS

FIELD OF THE INVENTION

The invention relates to cycloaliphatic polyester polyol compositions. The compositions, which are made from thermoplastic polyesters, are useful for formulating polyurethanes and other condensation polymers.

BACKGROUND OF THE INVENTION

Cycloaliphatic polyester polyols are intermediates used for the manufacture of polyurethane products, including foams, coatings, sealants, adhesives, and elastomers. The cycloaliphatic nature of these polyols imparts strength and flexibility while also providing desirable color stability, especially for coatings.

Cycloaliphatic polyester polyols can be made by hydrogenating aromatic rings of corresponding aromatic polyester polyols, which are in turn made by condensing aromatic diacid, diesters, or anhydrides (e.g., terephthalic acid, dimethyl terephthalate) with glycols such as ethylene glycol, propylene glycol, diethylene glycol, or the like. These starting materials usually derive exclusively from petrochemical sources.

As companies increasingly seek to offer products with improved sustainability, the availability of intermediates produced from bio-renewable and/or recycled materials becomes more leveraging. However, there remains a need for these products to deliver equal or better performance than their traditional petroleum-based alternatives at a comparable price point.

Bio-renewable content alone can be misleading as an indicator of "green" chemistry. For example, when a food source such as corn is needed to provide the bio-renewable content, there are clear trade-offs between feeding people and providing them with performance-based chemical products. Additionally, in some cases, the chemical or biochemical transformations needed to convert sugars or other bio-friendly feeds to useful chemical intermediates such as polyols can consume more natural resources and energy and can release more greenhouse gases and pollutants into the environment than their petro-based alternatives in the effort to achieve "green" status.

Waste thermoplastic polyesters, including waste polyethylene terephthalate (PET) streams (e.g., from plastic beverage containers), provide an abundant source of raw material for making new polymers, including cycloaliphatic polyester polyols. Usually, when PET is recycled, it is used to make new PET beverage bottles, PET fiber, or it is chemically transformed to produce polybutylene terephthalate (PBT). Other recycled raw materials are also available. For example, recycled propylene glycol is available from aircraft or RV deicing and other operations, and recycled ethylene glycol is available from spent vehicle coolants.

Urethane formulators demand polyols that meet required specifications for color, clarity, hydroxyl number, functionality, acid number, viscosity, and other properties. These specifications will vary and depend on the type of urethane application.

Polyols suitable for use in making high-quality polyurethanes have proven difficult to manufacture from recycled materials, including recycled polyethylene terephthalate (rPET). Many references describe digestion of rPET with glycols (also called "glycolysis"), usually in the presence of a catalyst such as zinc or titanium. Digestion converts the polymer to a mixture of glycols and low-molecular-weight PET oligomers. Although such mixtures have desirably low viscosities, they often have high hydroxyl numbers or high levels of free glycols. Frequently, the target product is a purified bis(hydroxyalkyl) terephthalate (see, e.g., U.S. Pat. Nos. 6,630,601, 6,642,350, and 7,192,988) or terephthalic acid (see, e.g., U.S. Pat. No. 5,502,247). Some of the efforts to use glycolysis product mixtures for urethane manufacture are described in a review article by D. Paszun and T. Spychaj (*Ind. Eng. Chem. Res.* 36 (1997) 1373.

Most frequently, ethylene glycol is used as the glycol reactant for glycolysis. This is sensible because it minimizes the possible reaction products. Usually, the glycolysis is performed under conditions effective to generate bis(hydroxyethyl) terephthalate ("BHET"), although sometimes the goal is to recover pure terephthalic acid. When ethylene glycol is used as a reactant, the glycolysis product is typically a crystalline or waxy solid at room temperature. Such materials are less than ideal for use as polyol intermediates because they must be processed at elevated temperatures. Polyols are desirably free-flowing liquids at or close to room temperature.

U.S. Pat. Nos. 6,359,022 and 6,664,363 teach to use hydrophobic materials, including fatty acids, fatty acid methyl esters, and triglycerides (fats and oils) as reactive components for making aromatic polyester polyols. The hydrophobic materials provide polyols with reduced viscosity at a given hydroxyl number and improved hydrocarbon solubility compared with traditional polyester polyols. The modified aromatic polyester polyols can be used more effectively with pentane and other blowing agents used to make rigid polyurethane foams. A wide variety of hydrophobic materials are taught as suitable for use. Scrap PET is taught as a useful alternative starting material to the usual phthalic anhydride reactant, but the working examples are limited to phthalic anhydride-based polyester polyols. Recently, we showed that aromatic polyester polyols can be made by reacting thermoplastic polyesters (e.g., recycled PET), glycols, and various hydrophobes (e.g., vegetable oils, dimer fatty acids, cardanol, and the like). The resulting polyols have high recycle content and desirable attributes for formulating polyurethane products.

Improved polyols are needed. In particular, the urethane industry needs sustainable polyols based in substantial part on recycled polymers such as the practically unlimited supply of recycled polyethylene terephthalate. Cycloaliphatic polyester polyols with high recycle content that satisfy the demanding color, clarity, viscosity, functionality, and hydroxyl content requirements of polyurethane formulators would be valuable.

SUMMARY OF THE INVENTION

The invention relates to polyester polyols and processes for making them. In one aspect, a process for making a cycloaliphatic polyester polyol is provided. The process comprises heating a thermoplastic polyester with a glycol to give a digested intermediate, and hydrogenating aromatic rings in the digested intermediate to produce the cycloaliphatic polyester polyol. The molar ratio of glycol to thermoplastic polyester is at least 2.0, and the cycloaliphatic polyester polyol has a hydroxyl number within the range of 25 to 800 mg KOH/g. Optionally, the digested intermediate is reacted with a hydrophobe prior to hydrogenation to give a modified polyol, and the modified polyol is hydrogenated to produce the cycloaliphatic polyester polyol.

In another aspect, a thermoplastic polyester, a glycol, and a hydrophobe are reacted in a single step to produce a modified polyol. Aromatic rings of the modified polyol are then hydrogenated to produce the cycloaliphatic polyester polyol. In this aspect, the amount of hydrophobe used is 3 to 70 wt. % based on the amount of cycloaliphatic polyester polyol produced, the molar ratio of glycol to thermoplastic polyester is at least 2.0, and the cycloaliphatic polyester polyol has a hydroxyl number within the range of 25 to 800 mg KOH/g.

In yet another aspect, virgin PET, recycled PET, or a mixture thereof is heated with propylene glycol in the presence of a titanium catalyst to give a digested intermediate. The digested intermediate is then reacted with a particular hydrophobe or mixture of hydrophobes to produce a modified polyol. Aromatic rings in the modified polyol are hydrogenated to give the cycloaliphatic polyester polyol. In this aspect, the molar ratio of propylene glycol to thermoplastic polyester is within the range of 2.5 to 4.5, the amount of hydrophobe used is 3 to 70 wt. % based on the amount of cycloaliphatic polyester polyol produced, and the cycloaliphatic polyester polyol has a hydroxyl number within the range of 25 to 800 mg KOH/g.

The invention includes cycloaliphatic polyester polyols made by these processes and various polyurethane or polyisocyanurate products made from the cycloaliphatic polyester polyols.

We surprisingly found that high-recycle-content cycloaliphatic polyester polyols having desirable hydroxyl numbers, viscosities, appearance, and other attributes for formulating polyurethane and polyisocyanurate products can be made by reacting, at certain equivalent ratios, a thermoplastic polyester, a glycol, and an optional hydrophobe, followed by catalytic hydrogenation. The cycloaliphatic polyester polyols, which are valuable for formulating polyurethane dispersions, two-component polyurethane coatings, mono- or poly(meth)acrylates, polyisocyanurates, flexible and rigid foams, coatings, adhesives, sealants, and elastomers, provide a sustainable alternative to petrochemical-based polyols.

DETAILED DESCRIPTION OF THE INVENTION

In one aspect, cycloaliphatic polyester polyols made by a two-step process are disclosed. A thermoplastic polyester is first heated with a glycol to give a digested intermediate. The digested intermediate is then hydrogenated to give the cycloaliphatic polyester polyol. Optionally, the digested intermediate is reacted with a hydrophobe to give a modified polyol, and hydrogenation of the modified polyol produces the cycloaliphatic polyester polyol.

Thermoplastic polyesters suitable for use are well known in the art. They are condensation polymers produced from the reaction of glycols and aromatic dicarboxylic acids or acid derivatives. Examples include polyethylene terephthalate (PET); polybutylene terephthalate (PBT); polytrimethylene terephthalate (PTT); glycol-modified polyethylene terephthalate (PETG); copolymers of terephthalic acid and 1,4-cyclohexanedimethanol (PCT); PCTA (an isophthalic acid-modified PCT); polyhydroxy alkanoates, e.g., polyhydroxybutyrate; copolymers of diols with 2,5-furandicarboxylic acid or dialkyl 2,5-furandicarboxylates, e.g., polyethylene furanoate; copolymers of 2,2,4,4-tetramethyl-1,3-cyclobutanediol with isophthalic acid, terephthalic acid or orthophthalic derivatives; dihydroferulic acid polymers; and the like, and mixtures thereof. Further examples of polyester thermoplastics are described in *Modern Polyesters: Chemistry and Technology of Polyesters and Copolyesters*, J. Scheirs and T. Long, eds., Wiley Series in Polymer Science, 2003, John Wiley & Sons, Ltd. Hoboken, N.J. Other examples of thermoplastic polyesters may be found in Chapters 18-20 of *Handbook of Thermoplastics*, O. Olabisi, ed., 1997, Marcel Dekker, Inc. New York. Suitable thermoplastic polyesters include virgin polyesters, recycled polyesters, or mixtures thereof. Polyethylene terephthalate is particularly preferred, especially recycled polyethylene terephthalate (rPET), virgin PET, and mixtures thereof. For more examples of suitable thermoplastic polyesters, see U.S. Pat. Appl. Publ. No. 2009/0131625, the teachings of which are incorporated herein by reference.

Recycled polyethylene terephthalate suitable for use in making the inventive polyester polyols can come from a variety of sources. The most common source is the post-consumer waste stream of PET from plastic bottles or other containers. The rPET can be colorless or contain dyes (e.g., green, blue, or other colors) or be mixtures of these. A minor proportion of organic or inorganic foreign matter (e.g., paper, other plastics, glass, metal, etc.) can be present. A desirable source of rPET is "flake" rPET, from which many of the common impurities present in scrap PET bottles have been removed in advance. Another desirable source of rPET is pelletized rPET, which is made by melting and extruding rPET through metal filtration mesh to further remove particulate impurities. Because PET plastic bottles are currently manufactured in much greater quantity than any recycling efforts can match, scrap PET will continue to be available in abundance.

Glycols suitable for use are well known. By "glycol," we mean a linear or branched, aliphatic or cycloaliphatic compound or mixture of compounds having two or more hydroxyl groups. Other functionalities, particularly ether or ester groups, may be present in the glycol. In preferred glycols, two of the hydroxyl groups are separated by from 2 to 10 carbons, preferably 2 to 5 carbons. Suitable glycols include, for example, ethylene glycol, propylene glycol, 1,3-propanediol, 1,2-butylene glycol, 1,3-butylene glycol, 1,4-butanediol, 2-methyl-1,3-propanediol, pentaerythritol, sorbitol, neopentyl glycol, glycerol, trimethylolpropane, 2,2,4,4-tetramethyl-1,3-cyclobutanediol, 3-methyl-1,5-pentanediol, 1,4-cyclohexanedimethanol, 1,3-cyclohexanedimethanol, bisphenol A ethoxylates, diethylene glycol, dipropylene glycol, triethylene glycol, 1,6-hexanediol, tripropylene glycol, tetraethylene glycol, polyethylene glycols having a number average molecular weight up to about 400 g/mol, block or random copolymers of ethylene oxide and propylene oxide, and the like, and mixtures thereof. Propylene glycol is particularly preferred. In a preferred aspect, the glycol is a recycled glycol, especially recycled propylene glycol. Propylene glycol recovered from used deicing fluids is one example.

The thermoplastic polyester and glycol are heated, optionally in the presence of a catalyst, to give a digested intermediate. The digested intermediate will commonly be a mixture of glycol reactant, glycol(s) generated from the thermoplastic polyester, terephthalate oligomers, and other glycolysis products. For example, when PET or rPET is the thermoplastic polyester, the digested intermediate will include a mixture of glycol reactant, ethylene glycol (generated from the PET or rPET), bis(2-hydroxyalkyl) terephthalate ("BHAT"), higher PET oligomers, and other glycolysis products. Similar digested mixtures in various forms have been made and characterized previously (see, e.g., D. Paszun et al., *Ind. Eng. Chem. Res.* 36 (1997) 1373 and N. Ikladious, *J. Elast. Plast.* 32 (2000) 140). Heating is advantageously performed at temperatures within the range of 80° C. to 260° C., preferably 100° C. to 240° C., more preferably 130° C. to 230° C., and most preferably 160° C. to 210° C.

In some aspects, when the thermoplastic polyester is polyethylene terephthalate, the digested intermediate comprises glycols and a terephthalate component. The terephthalate component may comprise, by gel permeation chromatography using ultraviolet detection, 45 to 70 wt. % of bis(hydroxyalkyl)terephthalates. In other aspects, the terephthalate component may further comprise 20 to 40 wt. % of terephthalate dimers. In still other aspects, the terephthalate component of the digested intermediate may comprise 45 to 65 wt. % of bis(hydroxyalkyl)terephthalates, 20 to 35 wt. % of terephthalate dimers, and 5 to 15 wt. % of terephthalate trimers. In other aspects, the terephthalate component may comprise 50 to 60 wt. % of bis(hydroxyalkyl)-terephthalates, 25 to 30 wt. % of terephthalate dimers, and 8 to 12 wt. % of terephthalate trimers. Some of these aspects are illustrated below in Tables 2 and 3.

Catalysts suitable for making the digested intermediate are well known (see, e.g., K. Troev et al., *J. Appl. Polym. Sci.* 90 (2003) 1148). In particular, suitable catalysts comprise titanium, zinc, antimony, germanium, zirconium, manganese, or other metals. Specific examples include titanium alkoxides (e.g., tetrabutyl titanate), titanium(IV) phosphate, zirconium alkoxides, zinc acetate, lead acetate, cobalt acetate, manganese(II) acetate, antimony trioxide, germanium oxide, or the like, and mixtures thereof. Catalysts that do not significantly promote isocyanate reaction chemistries are preferred. The amount of catalyst used is typically in the range of 0.005 to 5 wt. %, preferably 0.01 to 1 wt. %, more preferably 0.02 to 0.7 wt. %, based on the total amount of polyol being prepared.

Usually, the digestion reaction is performed by heating the thermoplastic polyester, glycol(s), and any catalyst at least until the mixture liquefies and particles of the thermoplastic polyester are no longer apparent. Reaction times range from about 30 minutes to about 16 hours, more typically 1 to 10 hours, even more typically 3 to 8 hours, and will depend on the reaction temperature, source of the thermoplastic polyester, the particular glycol reactant used, mixing rate, desired degree of depolymerization, and other factors that are within the skilled person's discretion.

The molar ratio of glycol to thermoplastic polyester is at least 2.0, preferably 2.0 to 6.0, more preferably 2.5 to 4.5. When the glycol/thermoplastic polyester molar ratio is below 2.0, the products are often solids or too viscous to be practical for use as polyols. On the other hand, when the glycol/thermoplastic polyester molar ratio is greater than about 6, the hydroxyl numbers tend to exceed the practical upper limit of about 800 mg KOH/g.

Optionally, the digested intermediate is reacted with a hydrophobe to produce a modified polyol, which is subsequently hydrogenated to give the cycloaliphatic polyester polyol. Hydrophobes suitable for use include triglycerides and modified triglycerides (especially triglycerides having saturated or unsaturated $C_6$-$C_{36}$ fatty acid units), fatty acids, fatty acid esters (especially fatty acid esters from saturated or unsaturated $C_6$-$C_{36}$ fatty acids), branched or linear $C_6$-$C_{36}$ fatty alcohols, dimer fatty acids, saturated or unsaturated $C_6$-$C_{18}$ dicarboxylic acids or diols, recycled cooking oils, vegetable oils and modified vegetable oils (as described, e.g., in U.S. Pat. Nos. 5,922,779; 6,359,022; and 6,664,363; and PCT Internat. Appl. No. WO 2013/154874); castor oil or alkoxylated castor oil (as described, e.g., in PCT Internat. Appl. No. WO 2013/154874); modified or derivatized polyterpenes; modified cashew nut shell oil; cardanol; derivatives of cardanol; Diels Alder or ene reaction modified polyols (as described, e.g., in PCT. Internat. Appl. No. 2013/109834); tall oil fatty acids (as described, e.g., in U.S. Pat. Nos. 5,075,417 and 4,897,429); and hydroxy-functional materials derived from epoxidized, ozonized, or hydroformylated fatty esters or fatty acids, and mixtures thereof.

Suitable triglycerides include, e.g., soybean oil, animal tallow, fish oil, canola oil, castor oil, tung oil, linseed oil, corn oil, recycled cooking oil, sunflower oil, palm oil, peanut oil, palm kernel oil, cottonseed oil, coconut oil, safflower oil, and the like, and mixtures thereof. Suitable fatty acids include, e.g., linoleic, myristic, palmitic, caproic, caprylic, capric, 2-ethylhexanoic, lauric, stearic, oleic, linolenic, ricinoleic, tall oil, and the like, and mixtures thereof. The alkyl esters of these fatty acids and mixtures of these alkyl esters are also suitable. Suitable fatty diacids include, e.g., azelaic acid; sebacic acid; dodecanedioic acid; tetradecanedioic acid; hexadecanedioic acid; octadecanedioic acid; nonene dioic acid; decenedioic acid, dodecenedioic acid; tetradecenedioic acid; hexadecenedioic acid; octadecenedioic acid; eicosendioic acid; eicosandioic acid; docosandioic acid; tetracosandioic acid; tetracosendioic acid; and the like, and mixtures thereof.

In some aspects, the hydrophobe is a dimer fatty acid. As used herein, "dimer fatty acid" is synonymous with "dimerized fatty acid" or "dimer acid." Dimer fatty acids are chemical intermediates made by dimerizing unsaturated fatty acids (e.g., oleic acid, linoleic acid, linolenic acid, ricinoleic acid) in the presence of a catalyst, such as a bentonite or montmorillonite clay. Commercially available dimer fatty acids are usually mixtures of products in which the dimerized product predominates. Some commercial dimer acids are made by dimerizing tall oil fatty acids. Dimer fatty acids frequently have 36 carbons and two carboxylic acid groups. They may be saturated or unsaturated. They may also be hydrogenated to remove unsaturation. In a preferred aspect, the dimer fatty acid comprises dimerized oleic acid, trimerized oleic acid, dimerized linoleic acid, trimerized linolelic acid, dimerized linolenic acid, trimerized linolenic acid, or mixtures thereof. Suitable dimer fatty acids include Pripol™ dimer fatty acids (products of Croda) such as Pripol™ 1006, 1009, 1010, 1012, 1013, 1017, 1022, 1025, 1027, 1029, 1036, and 1098; Unidyme™ dimer acids (products of Arizona Chemical) such as Unidyme 10, 14, 18, 22, 35, M15, and M35; dimer acids available from Emery Oleochemicals, and FloraDyme™ dimer acids from Florachem Corporation.

Methods for synthesizing dimer fatty acids suitable for use are also known. Fatty acids having at least one carbon-carbon double bond are dimerized in the presence of a catalyst such as a montmorillonite, kaolinite, hectorite, or attapulgite clay (see, e.g., U.S. Pat. Nos. 2,793,220, 4,371,469, 5,138,027, and 6,281,373, the teachings of which are incorporated herein by reference; see also WO 2000/075252 and CA 104511).

The reaction between the digested intermediate and the hydrophobe is generally performed under conditions effective to promote condensation between one or more acid or ester groups of the hydrophobe and hydroxyl groups present in the digested intermediate. The reaction is preferably performed by heating at temperatures within the range of 80° C. to 260° C., preferably 100° C. to 240° C., more preferably 130° C. to 230° C., and most preferably 160° C. to 210° C. Water or alcohol generated in this reaction is advantageously removed from the reaction mixture as it forms. On a lab scale, it is convenient to use a Dean-Stark trap or similar apparatus to remove the water or alcohol of reaction, but other means will be more practical on a larger scale. Continuous processes for water or alcohol removal, such as vacuum stripping, wiped-film evaporation, and the like, may be desirable. The condensation reaction is normally continued until a pre-determined amount of water or alcohol has been collected or a target acid number and/or hydroxyl number is reached for the product.

When present, the hydrophobe can be used in any desired proportion. Generally, 3 to 70 wt. %, or 3 to 50 wt. %, or 5 to 40 wt. % of the hydrophobe is used based on the amount of cycloaliphatic polyester polyol produced.

One or more other dicarboxylic acids can also be included in making the cycloaliphatic polyester polyols. Instead of including a dicarboxylic acid, a diester, or an anhydride can be used. Suitable dicarboxylic acids include, for example, glutaric acid, adipic acid, succinic acid, cyclohexane dicarboxylic acids, maleic acid, fumaric acid, itaconic acid, phthalic acid, 1,5-furandicarboxylic acid, isophthalic acid, and anhydrides thereof (e.g., maleic anhydride, phthalic anhydride, itaconic anhydride, and the like). Mixtures of dicarboxylic acids can be used, including, e.g., the commercially available mixture of dibasic acids known as "DBA." A typical DBA composition might contain 51-61 wt. % glutaric acid, 18-28 wt. % succinic acid, and 15-25 wt. % adipic acid.

In another aspect, the thermoplastic polyester, glycol, and hydrophobe are reacted in a single step under conditions effective to produce a modified polyol. The modified polyol is then hydrogenated to produce the cycloaliphatic polyester polyol. The hydrophobe is used in an amount within the range of 3 to 70 wt. % based on the amount of cycloaliphatic polyester polyol produced. The molar ratio of glycol to thermoplastic polyester is at least 2.0, and the resulting polyol has a hydroxyl number within the range of 25 to 800 mg KOH/g, 25 to 500 mg KOH/g, or in some aspects, 40 to 400 mg KOH/g.

The digested intermediate or the modified polyol made as described above is hydrogenated to give a cycloaliphatic polyester polyol. As used herein, "cycloaliphatic polyester polyol" refers to polyols in which at least one cyclic, saturated carbocyclic six-membered ring or at least one saturated heterocyclic five-membered ring is present in the polyol. These saturated rings originate from a carbocyclic or heterocyclic aromatic ring that was part of the thermoplastic polyester and was part of the digested intermediate or modified polyol prior to hydrogenation.

Hydrogenation can be performed by any suitable means using a variety of heterogeneous or homogeneous catalysts. In some aspects, hydrogenation is performed by reacting the modified polyol with molecular hydrogen in the presence of a transition metal catalyst comprising nickel, platinum, palladium, rhodium, rhenium, ruthenium, iridium, gold, silver, copper, or the like. Nickel, palladium, platinum, and rhodium are preferred. Conditions for catalytic hydrogenation of aromatic rings are well known in the art. Generally, elevated temperatures (e.g., 50° C. to 200° C., preferably 100° C. to 180° C.) and pressures (0.2 to 20 MPa, preferably 2 to 10 MPa) are desirable. For more on catalytic hydrogenation and suitable catalysts, see *March's Advanced Organic Chemistry*, $5^{th}$ Ed., pp. 1002-1010, and references cited therein, and F. A. Carey and R. J. Sundberg, Advanced Organic Chemistry, $3^{rd}$ Ed., Part B: Reactions and Synthesis, pp. 219-230, and references cited therein.

The cycloaliphatic polyester polyols have hydroxyl numbers within the range of 25 to 800 mg KOH/g, 25 to 500 mg KOH/g, or in some aspects, 40 to 400 mg KOH/g. Hydroxyl number can be measured by any accepted method for such a determination, including, e.g., ASTM E-222 ("Standard Test Methods for Hydroxyl Groups Using Acetic Anhydride Acetylation").

The polyols preferably have average hydroxyl functionalities (i.e., the average number of —OH groups per molecule) within the range of 1.5 to 3.5, more preferably 1.8 to 2.5, and most preferably 2.0 to 2.4.

The polyols are flowable liquids under ambient conditions. Preferably, the polyols have viscosities measured at 75° C. less than 30,000 cP, more preferably less than 20,000 cP, most preferably less than 10,000 cP. A preferred range for the polyol viscosity (measured at 75° C.) is 300 to 5,000 cP, more preferably 500 to 3,900 cP. Viscosity can be determined by any industry-accepted method. It is convenient to use, for instance, a Brookfield viscometer (such as a Brookfield DV-III Ultra rheometer) fitted with an appropriate spindle, and to measure a sample at several different torque settings to ensure an adequate confidence level in the measurements.

The polyols preferably have low acid numbers. Urethane manufacturers will often require that a polyol have an acid number below a particular specification. Low acid numbers can be ensured by driving the reaction with any hydrophobe to the desired level of completion or by adding a neutralizing agent (e.g., sodium hydroxide) at the conclusion of the condensation step. Preferably, the polyols have an acid number less than 30 mg KOH/g, more preferably less than 10 mg KOH/g, and most preferably less than 5 mg KOH/g. As suggested above, it is acceptable practice to adjust acid numbers if necessary for a particular application with an acid scavenger such as, for example, an epoxide derivative, and this treatment can be performed by the manufacturer, distributor, or end user.

In some aspects, when polyethylene terephthalate is the thermoplastic polyester used to make the cycloaliphatic polyester polyol, gel permeation chromatography using refractive index detection may indicate that the cycloaliphatic polyester polyol contains 10 to 30 wt. % or 15 to 20 wt. % of monomers, 5 to 20 wt. % or 7 to 15 wt. % of dimers, and 50 to 80 wt. % or 65 to 75 wt. % of combined trimers and dimer fatty acid-modified products. See, e.g., Table 3 below.

An advantage of the cycloaliphatic polyester polyols is their reduced reliance on petrochemical sources for raw material. Preferably, the polyols include greater than 10 wt. %, more preferably greater than 25 wt. %, most preferably greater than 50 wt. % of green content. A preferred range for the green content is 25 to 99.5 wt. %. By "green content," we mean the combined amounts of recycle content and bio-renewable content. Some glycols, such as propylene glycol or ethylene glycol, are available as recovered or recycled materials. For instance, propylene glycol is used in deicing fluids, and after use, it can be recovered, purified, and reused. Frequently, hydrophobes are prepared from renewable resources, e.g., natural oils. Green content can be calculated, for instance, by combining the masses of recycled thermoplastic polyester and any recycled PG, bio-renewable dicarboxylic acids, and bio-renewable hydrophobes and dividing this sum by the total mass of reactants (glycols, thermoplastic polyester, hydrophobe, and any dicarboxylic acids), and then multiplying the result by 100. As used herein, "recycle content" refers to percentage by weight of the combined amounts of starting materials recovered from scrap polymers, waste glycols, and other materials that may have originated from petrochemical sources. As used herein, "bio-renewable content" refers to the percentage by weight of starting materials derived from renewable resources such as plant or animal sources, especially biomass or other low-value co-products of plant processing.

Although performance in the ultimate end use is paramount, urethane manufacturers like to purchase visually appealing polyols. When other considerations are equal, a transparent (or nearly transparent) polyol may be more attractive than an opaque one. ("Dispersion polyols" or "polymer polyols," which are common components of the load-bearing, high-resiliency urethane foams used in automotive seating or furniture applications, are a notable exception; they are supposed to appear opaque.) Unlike known polyols that are made by reacting thermoplastic polyester digestion products with dicarboxylic acids such as succinic acid or phthalic anhydride, which are often opaque, the inventive cycloaliphatic polyols (and the modified polyols from which they are made) are frequently transparent or nearly so. This is particularly true when the molar ratio of glycol to thermoplastic polyester is kept within the range of 2.5 to 4.

Yet another desirable polyol attribute is the absence of settling, particularly upon prolonged storage. When settling is substantial, the polyol might have to be filtered or otherwise treated to remove the solids content; this is preferably avoided. Preferred cycloaliphatic polyols exhibit no settling or only a slight degree of settling, and more preferred polyols exhibit no evidence of settling.

In a specific aspect, the invention relates to a process for making a cycloaliphatic polyol. The process comprises first heating virgin PET, recycled PET, or a mixture thereof with propylene glycol in the presence of a titanium catalyst to give a digested intermediate. The digested intermediate is then reacted with a particular hydrophobe to produce a modified polyol. The hydrophobe is selected from the group consisting of triglycerides or modified triglycerides having saturated or unsaturated $C_6$-$C_{36}$ fatty acid units; fatty acids; fatty acid esters from saturated or unsaturated $C_6$-$C_{36}$ fatty acids; branched or linear $C_6$-$C_{36}$ fatty alcohols; dimer fatty acids; saturated or unsaturated $C_6$-$C_{18}$ dicarboxylic acids or diols; recycled cooking oils; vegetable oils and modified vegetable oils; castor oil or alkoxylated castor oil; modified or derivatized polyterpenes; modified cashew nut shell oil; cardanol; derivatives of cardanol; Diels Alder or ene reaction modified polyols; tall oil fatty acids; hydroxy-functional materials derived from epoxidized, ozonized, or hydroformylated fatty esters or fatty acids, and mixtures thereof. Aromatic rings of the modified polyol are then hydrogenated to produce the cycloaliphatic polyester polyol. The molar ratio of propylene glycol to thermoplastic polyester is within the range of 2.5 to 4.5, the amount of hydrophobe used is 3 to 70 wt. % based on the amount of cycloaliphatic polyester polyol produced, and the cycloaliphatic polyester polyol has a hydroxyl number within the range of 25 to 800 mg KOH/g.

The cycloaliphatic polyester polyols can be used to formulate a wide variety of polyurethane and polyisocyanurate products. By adjusting the proportion of hydrophobe used, a desired degree of polyol hydrophobicity can be "dialed in." The ability to control hydrophobicity is particularly valuable in the coatings industry. The polyols can be used for cellular, microcellular, and non-cellular applications including flexible foams, rigid foams (including polyisocyanurate foams), polyurethane dispersions, coatings, adhesives, sealants, and elastomers. The resulting polyurethanes are potentially useful for automotive and transportation applications, building and construction products, marine products, packaging foam, flexible slabstock foam, carpet backing, appliance insulation, cast elastomers and moldings, footwear, biomedical devices, and other applications.

Further, the cycloaliphatic polyester polyols may be derivatized to form mono-, di- and polyacrylates via esterification or transesterification with acrylic acid or methacrylic acid-derived raw materials. Examples of (meth)acrylation raw materials suitable for forming (meth)acrylate derivatives of the inventive polyester polyols include acryloyl chloride, methacryloyl chloride, methacrylic acid, acrylic acid, methyl acrylate, methyl methacrylate, and the like, or mixtures thereof. Such (meth)acrylate-derivatized inventive polyester polyols are useful for radiation or UV-cure coating formulations or applications. Prepolymers of the inventive polyester polyols may be derivatized to form urethane (meth)acrylates via reaction with hydroxyethyl (meth)acrylate. The resulting urethane acrylates may also be used in radiation or UV-cure coating formulations or applications.

In a particular aspect, the invention relates to a two-component polyurethane coating made from the cycloaliphatic polyester polyol. By "two-component," we mean a reaction product of at least one hydroxy-functional component (including the cycloaliphatic polyester polyol and optional other polyols and/or chain extenders) and at least one polyisocyanate. In a typical example, the cycloaliphatic polyester polyol is combined with optional polyols (e.g., an aromatic polyester polyol) and optional chain extenders (e.g., ethylene glycol, 1,4-butanediol, 2-methyl-1,3-propanediol, or the like) and this "B side" component is combined and reacted with one or more polyisocyanates, i.e., the "A side" (e.g., MDI, TDI, HDI, IPDI, or the like, or mixtures thereof), optionally in the presence of a solvent, catalyst, and other components. The reaction mixture can then be applied to a surface to generate the 2K polyurethane coating. It may be desirable to subject the resulting coating to heat or ultraviolet light to complete the cure.

In a particular aspect, the invention relates to aqueous polyurethane dispersions made from the cycloaliphatic polyester polyols. The polyols can be formulated into aqueous polyurethane dispersions having a desirable balance of properties, including high solids, low viscosities, and a low tendency to settle. Numerous ways to formulate aqueous polyurethane dispersions are known and suitable for use. Preferably, the polyurethane dispersion is made by emulsifying an isocyanate-terminated prepolymer in water with the aid of an emulsifiying agent. Water, a water-soluble polyamine chain extender, or a combination thereof may be used to react with the emulsified prepolymer. The prepolymer is preferably made by reacting an inventive cycloaliphatic polyester polyol, a hydroxy-functional emulsifier, one or more auxiliary polyols, and one or more polyisocyanates. The aqueous polyurethane dispersions are preferably used to formulate water-borne coatings, adhesives, sealants, elastomers, and similar urethane products, and they are particularly valuable for reducing reliance on solvents. For instance, the dispersions can be used to formulate low- or zero-VOC compositions.

Polyisocyanates suitable for use in making the prepolymers are well known; they include aromatic, aliphatic, and cycloaliphatic polyisocyanates. Examples include toluene diisocyanates (TDIs), MDIs, polymeric MDIs, naphthalene diisocyanates (NDIs), hydrogenated MDIs, trimethyl- or tetramethylhexamethylene diisocyanates (TMDIs), hexamethylene diisocyanate (HDI), isophorone diisocyanates (IPDIs), cyclohexane diisocyanates (CHDIs), xylylene diisocyanates (XDI), hydrogenated XDIs, and the like. Aliphatic diisocyanates, such as hexamethylene diisocyanate and isophorone diisocyanates are particularly preferred.

Auxiliary polyols suitable for use are also well known. They include polyether polyols, aliphatic polyester polyols, aromatic polyester polyols, polycarbonate polyols, glycols, and the like. Preferred auxiliary polyols have average hydroxyl functionalities within the range of 2 to 7, preferably 2 to 5, and number average molecular weights within the range of 200 to 10,000, preferably 500 to 8,000. Preferred polyester polyols are condensation products of dicarboxylic acids and diols or triols (e.g., ethylene glycol, propylene glycol, 2-methyl-1,3-propanediol, 3-methyl-1,5-pentanediol, 1,4-butanediol, neopentyl glycol, glycerin, trimethylolpropane, 1,4-cyclohexanedimethanol, bisphenol A ethoxylates), especially diols. The dicarboxylic acids can be aliphatic (e.g., glutaric, adipic, succinic) or aromatic (e.g., phthalic), preferably aliphatic.

A hydroxy-functional emulsifier is also used to make the polyurethane dispersions. The role of this component is to impart water-dispersibility to the prepolymer, usually upon its combination with water and a neutralizing agent, such as an acid or base reactant. Thus, in one aspect, the hydroxy-functional emulsifier is an acid-functional diol such as dimethylolpropionic acid (DMPA) or dimethylolbutanoic acid (DMBA). The acid functionality in the resulting prepolymer allows for neutralization with an amine or other basic reactant to generate a water-dispersible urethane. The hydroxy-functional emulsifier can also be an amine, such as N-methyldiethanolamine. Neutralization of the resulting prepolymer with an acidic reagent renders it water dispersible. In other aspects, the hydroxy-functional emulsifier is nonionic, e.g., a polyethylene glycol monomethyl ether. In another aspect, the hydroxy-functional emulsifier may be a monol- or diol-functionalized poly(ethylene oxide), such as for example Ymer™ N120 dispersing monomer (product of Perstorp), or the methyl ether of polyethylene glycol. Additionally, non-reactive, so-called "external emulsifiers," such as the triethanolamine salt of dodecylbenzene sulfonic acid, may be included in the aqueous phase to assist in the emulsification and stabilization of the prepolymer and resulting polyurethane dispersion.

In certain aspects, a chain terminator may be used to control the molecular weight of polyurethane polymer contained within the aqueous polyurethane dispersion. Monofunctional compounds, such as those containing hydroxyl, amino, and thio groups that have a single active hydrogen-containing group, are suitable chain terminators. Examples include alcohols, amines, thiols, and the like, especially primary and secondary aliphatic amines.

Chain extenders can also be included in making the polyurethane dispersion. In some aspects, the chain extender is added in an amount sufficient to react 5 to 105 mole % of free NCO groups present. Suitable chain extenders contain at least two functional groups that are capable of reacting with isocyanates, e.g., hydroxyl, thio, or amino groups in any combination. Suitable chain extenders include, for example, diols (ethylene glycol, propylene glycol, diethylene glycol, neopentyl glycol, 1,4-butanediol, 2-methyl-1,3-propanediol, 3-methyl-1,5-pentanediol, 1,4-cyclohexanedimethanol, and the like), di- and polyamines (ethylenediamine, diethylenetriamine, Jeffamine® T-403, Jeffamine® D-230, Jeffamine® ED-2001, Jeffamine® ED-600, Jeffamine® ED-900, 1,6-hexamethylenediamine, butylenediamine, hydrazine, piperazine, N-hydroxyethyl ethylenediamine) alkanolamines (ethanolamine, diethanolamine, N-methyl diethanolamine, and the like), dithiols, and the like. Diol chain extenders are preferably added during the preparation of the prepolymer, and prior to emulsification in water.

In a specific example, the cycloaliphatic polyester polyol, an acid-functional diol (DMPA), and auxiliary polyols (polyethylene glycol 200 and a polyester polyol made from 3-methyl-1,5-pentanediol and adipic acid) are combined and reacted with a mixture of aliphatic diisocyanates (hexamethylene diisocyanate and isophorone diisocyanate) in the presence of a tin catalyst (dibutyltin dilaurate) or a bismuth catalyst (such as bismuth dioctanoate) and a solvent (acetone). The resulting prepolymer is then dispersed in a mixture of water, triethanolamine (neutralizing agent), and a silicone defoamer. The resulting product is an aqueous polyurethane dispersion having high solids content (30%), low viscosity, and desirable settling properties.

For more examples of suitable approaches for preparing aqueous polyurethane dispersions, see U.S. Pat. Nos. 5,155, 163; 5,608,000; 5,763,526; 6,339,125; 6,635,723, 7,045, 573; and 7,342,068, the teachings of which are incorporated herein by reference.

In another aspect, the invention relates to associative rheology modifiers made from the cycloaliphatic polyester polyols. By "associative rheology modifier," we mean an additive used to thicken or alter the viscosity of a product. Associative thickening may involve dynamic, non-specific interactions of hydrophobic end groups of a thickener molecule with itself and with other components of a formulation. Associative thickening is particularly applicable to water-based paints and coatings, where the rheology modifier, by virtue of inter- and intra-molecular network formations, is able to modify gloss, flow, shear, leveling, spatter resistance, or other properties. In addition to paints or coatings, suitable formulations might include sealants, pharmaceuticals, cosmetics, or other products that can benefit from rheology modification. Certain categories of associative rheology modifiers are well known and can be formulated using the inventive polyester polyols alone or, more often, in combination with other polyol components. Such rheology modifiers include, for example, hydrophobically modified ethoxylated urethanes ("HEUR"), hydrophobically modified alkali-swellable emulsions ("HASE"), and hydrophobically modified polyethers ("HMPE"). Suitable HASE modifiers include, e.g., hydrophobically modified polyacrylates. A typical HEUR might be assembled from a hydrophilic diol (e.g., a polyethylene glycol of 6,000-8,000 g/mol), a polyisocyanate, and a hydrophobic monol or diol. The cycloaliphatic polyester polyols can be utilized to supplement or replace the hydrophobic monol or diol. For examples of HEUR, HASE, and HMPE associative rheology modifiers and their methods of preparation, see U.S. Pat. Nos. 8,871,817; 8,673,275; 8,697,797; 8,524,649; 8,461, 213; 8,334,357; 6,337,366; 5,574,127; 5,281,654; 4,155, 892; and 4,079,028, the teachings of which are incorporated herein by reference.

The following examples merely illustrate the invention; the skilled person will recognize many variations that are within the spirit of the invention and scope of the claims.

Dimer Fatty Acid-Modified Polyol

A reactor equipped with an overhead mixer, condenser, heating mantle, thermocouple, and nitrogen inlet is charged with zinc acetate dihydrate (0.01 to 0.03 moles per mole of recycled PET); recycled green polyethylene terephthalate pellets; and propylene glycol (3.0 moles per mole of recycled PET). The mixture is heated without stirring to about 130° C. Stirring is then commenced at 60 rpm, and heating continues until the reactor contents reach 200° C. The mixture is heated until no particles of recycled PET remain (about 4 h). When the digestion reaction is considered complete, the mixture is cooled to about 100° C. Dimer fatty acid is added, and the mixing rate is increased (200 rpm). The dimer fatty acid used is Pripol™ 1017, product of Croda. When the addition is complete, a Dean-Stark trap is introduced between the reactor and condenser, and heating to 200° C. is resumed. Water generated in the condensation reaction is removed until roughly the theoretical amount is removed. When the reaction is complete, the polyol product is allowed to cool to 100° C. and is then decanted from the reactor. Any residual solids are removed by filtration through cheesecloth.

Cycloaliphatic Polyester Polyol

Dimer fatty acid-modified polyol prepared as described above (700 g) is combined with activated carbon (50 g) in methanol/tetrahydrofuran (1.4 L of 1:1 mixture by vol.), and the mixture is heated to 60° C. for 2 h. The mixture is filtered, and the filtrate is concentrated. The treated polyol is hydrogenated at 150° C. and 6 MPa for 72 h in the presence of 10 wt. % rhodium on carbon (60 g). Analysis of the product by $^1$H NMR indicates about 90% conversion to the desired cycloaliphatic product.

Blends of Dimer Fatty Acid-Modified Polyol and Cycloaliphatic Polyester Polyol

Blends are prepared that contain: (a) 25 wt. % of DFA-modified polyester polyol and 75 wt. % of cycloaliphatic polyester polyol; (b) 50 wt. % of DFA-modified polyester polyol and 50 wt. % of cycloaliphatic polyester polyol; and (c) 75 wt. % of DFA-modified polyester polyol and 25 wt. % of cycloaliphatic polyester polyol. These blends are converted to 2K polyurethane coatings as is described below.

Gel Permeation Chromatography Analysis

A Waters gel permeation chromatograph is used to analyze polyol samples diluted in tetrahydrofuran (~17 mg polyol/4 mL THF). Pump: Waters 590; injector: Waters 717+WISP; detector: Waters 486 UV at 295 nm or Waters 410 dRI at 16×; columns: Jordi 500 Å 250×10 mm catalog #15021; temperature: 37° C.; injection volume: 100 μL; flow rate: 1.0 mL/min.; sampling rate: 1.0 point per second; data processing: Millennium 2.10 software. Calibration: polystyrene standards.

Two-Component Polyurethane Formulations

The dimer fatty acid-modified polyol, cycloaliphatic polyester polyol, or blend (0.077 eq.) is combined and mixed in a beaker with a mixture of methyl ethyl ketone and propylene glycol methyl ether acetate to give a homogeneous 50 wt. % mixture of polyol(s) in solvent. Hexamethylene diisocyanate (4.76 g, 0.566 eq.) and isophorone diisocyanate (2.70 g, 0.243 eq.) are added and mixing continues. Dibutyltin dilaurate (0.05 wt. %) is added and mixed well. After 60 seconds of reaction time, during which an exotherm is noted (0.7° C. for the aliphatic polyol; 4° C. for the control polyol), a bead of the reacting mixture is applied to one side of each of five aluminum panels (4"×6"). The beads of solvent-borne polyurethane are drawn down using a #50 R.D. Specialties bar to a wet film thickness of 4.5 mils. The panels flash dry in a hood at ambient temperature for at least one hour. They are then heated to 130° C. for 0.5 h to complete the cure. The films, which have an approximate dry film thickness of 1.2 mils, are tested as described further below.

Testing Methods for 2K Polyurethane Coatings:

Dry film thickness is determined using a PosiTector 6000 (Defelsko Corporation) dry film thickness gauge. Konig hardness is measured using ISO 1522 using a TQC pendulum hardness tester (Model SP0500). The following ASTM test methods are used: pencil scratch hardness: ASTM D3363; flexibility: ASTM D522; adhesion: ASTM D3359; stain testing: ASTM D1308; MEK double rubs testings: ASTM D4752.

"Recycle content" as used herein (wt. %) is determined by combining the masses of propylene glycol and recycled thermoplastic polyester, dividing this sum by the total mass of reactants (e.g., propylene glycol, rPET, and dimer acid), and then multiplying the result by 100. Hydroxyl numbers are determined by ASTM E-222. Viscosities are measured at 25° C. using a Brookfield DV-III Ultra rheometer with spindle #31 at 25%, 50%, and 75% torque. Color, clarity, and degree of settling are evaluated visually.

Results:

Table 1 summarizes properties for a dimer fatty acid-modified rPET polyol, which is prepared by reacting dimer fatty acid with a depolymerized recycled PET, and a cycloaliphatic polyol made by catalytic hydrogenation of the dimer fatty acid-modified rPET polyol.

Table 2 shows results of gel permeation chromatography analysis of a dimer fatty acid-modified polyester polyol and the cycloaliphatic polyester polyol made by hydrogenating the DFA-modified polyol. The % conversion upon hydrogenation can be estimated by comparing results from the ultraviolet detector, which is sensitive for chromophores present in the aromatic starting material. By comparing area percentages, it is apparent that conversion of the DFA-modified polyester polyol to a cycloaliphatic analog by catalytic hydrogenation exceeded 90-95%, and may have exceeded 99%.

Table 3 provides GPC results using a refractive index detector. These results generally indicate that the hydrogenation conditions may also promote molecular weight growth. The proportion of DFA-modified species (versus monomers or dimers) appears to increase as a result of hydrogenation. The decrease in hydroxyl number upon hydrogenation is consistent with this idea.

Table 4 provides results from testing two-component (2K) polyurethane coatings made from the polyols and polyol blends. As shown in the table, the cycloaliphatic polyol imparts softness and flexibility to the coating. When the cycloaliphatic polyol is blended with the DFA-modified aromatic polyol, the 2K polyurethane coating can range from soft and flexible (see Example 3 with 75% of the cycloaliphatic polyol) to harder and less flexible (see Example 5 with 25% of the cycloaliphatic polyol). This provides a "dial" that can be used to fine-tune the nature of the polyurethane coating to fit the intended application.

The preceding examples are meant only as illustrations; the following claims define the inventive subject matter.

TABLE 1

Cycloaliphatic Polyol from Hydrogenation of Dimer Fatty Acid-Modified Polyol

| Ex | rPET polyol | Cat | Glycol/ PET | DFA/ PET | Funct. | Recycle % | Mol. wt. | OH # | Color | Transparent? | Settles? | Visc., 25° C. |
|---|---|---|---|---|---|---|---|---|---|---|---|---|
| C1 | DFA-modified polyol | Zn | 3.0 | 0.5 | 2.0 | 59 | 285 | 394 | green | yes | slight | 6035 |
| 2 | Cycloaliphatic polyol | — | — | — | 2.0 | 59 | 325 | 345 | yellow | yes | no | 498 |

TABLE 2

Summary of GPC Results (UV detection)

| | Monomers | | Dimers | | Trimers | | DFA-modified portion | |
|---|---|---|---|---|---|---|---|---|
| Ex | ret times | wt. % | ret times | wt. % | ret times | wt. % | ret times | wt. % |
| C1 DFA-modified polyol | 23.13 | 35.8 | 21.78 | 18.9 | 20.85 | 8.2 | 19.58-18.38 | 37.1 |
| 2 Cycloaliphatic polyol | 23.15 | 7.8 | 21.93 | 9.2 | 21.00 | 6.5 | 19.68-18.23 | 71.5 |

| | UV area (%) |
|---|---|
| C1 DFA-modified polyol | 5,481,609 (99.5%) |
| 2 Cycloaliphatic polyol | 29,546 (0.5%) |

Monomers (BHATs = bis(hydroxyalkyl)terephthalates) have one, dimers have two, and trimers have three terephthalate units in the non-hydrogenated product. After hydrogenation, the rings are principally cycloaliphatic.

TABLE 3

Summary of GPC Results (RI detection)

| | Monomers | | Dimers | | Combined Trimers + DFA-modified portion | |
|---|---|---|---|---|---|---|
| Ex | ret times | wt. % | ret times | wt. % | ret times | wt. % |
| C1 DFA-modified polyol | 23.28 | 24.2 | 21.93 | 10.7 | 20.35-18.55 | 60.0 |
| 2 Cycloaliphatic polyol | 23.30 | 17.3 | 22.07 | 7.7 | 20.50-18.72 | 63.2 |

TABLE 4

Two-Component (2K) Polyurethane Coatings*

| | | | Stain Testing (and 1-hour recovery results) | | | | | MEK | | |
|---|---|---|---|---|---|---|---|---|---|---|
| Ex | rPET polyol | OH # | WIN | EtOH, 50% | Vinegar | H$_2$O | Pencil | X-Hatch Adhesion | double rubs | Konig oscillations | ⅛" mandrel bend |
| C1 | DFA-modified polyol | 394 | 5/5 | 4/4 | 5/5 | 0/0 | 6 | 5 | 15 | 91 | fail |
| 2 | Cycloaliphatic polyol | 345 | 4/4 | 2/2 | 4/4 | 0/0 | 0 | 5 | 18 | 13 | 0T |
| 3 | 25% DFA-modified polyol + 75% cycloaliphatic polyol | 357 | 4/4 | 3/3 | 4/4 | 0/0 | 0 | 5 | 10 | 32 | 0T |
| 4 | 50% DFA-modified polyol + 50% cycloaliphatic polyol | 370 | 4/4 | 3/3 | 5/5 | 0/0 | 3 | 4 | 14 | 51 | fail |
| 5 | 75% DFA-modified polyol + 25% cycloaliphatic polyol | 382 | 5/5 | 4/4 | 5/5 | 0/0 | 6 | 5 | 12 | 78 | fail |

*Performance not optimized. WIN = Windex ® cleaner.

We claim:

1. A process for making a cycloaliphatic polyester polyol, comprising:
   (a) heating a thermoplastic polyester with a glycol to give a digested intermediate;
   (b) reacting the digested intermediate with a dimer fatty acid to give a modified polyol; and
   (c) hydrogenating aromatic rings in the modified polyol to produce the cycloaliphatic polyester polyol;
   wherein the molar ratio of glycol to thermoplastic polyester is at least 2.0 and the cycloaliphatic polyester polyol has a hydroxyl number within the range of 25 to 800 mg KOH/g.

2. The process of claim 1 wherein the thermoplastic polyester is selected from the group consisting of polyethylene terephthalate; polybutylene terephthalate; polytrimethylene terephthalate; glycol-modified polyethylene terephthalate; copolymers of terephthalic acid with 1,4-cyclohexanedimethanol; isophthalic acid-modified copolymers of terephthalic acid with 1,4-cyclohexanedimethanol; copolymers of diols with 2,5-furandicarboxylic acid; copolymers of diols with dialkyl 2,5-furandicarboxylates; copolymers of 2,2,4,4-tetramethyl-1,3-cyclobutanediol with isophthalic acid derivatives; copolymers of 2,2,4,4-tetramethyl-1,3-cyclobutanediol with terephthalic acid derivatives; copolymers of 2,2,4,4-tetramethyl-1,3-cyclobutanediol with orthophthalic acid derivatives; dihydroferulic acid polymers; and mixtures thereof.

3. The process of claim 1 wherein the thermoplastic polyester is selected from the group consisting of virgin PET, recycled PET, and mixtures thereof.

4. The process of claim 1 wherein the glycol is selected from the group consisting of ethylene glycol, propylene glycol, 1,3-propanediol, 1,2-butylene glycol, 1,3-butylene glycol, 1,4-butanediol, 2-methyl-1,3-propanediol, pentaerythritol, sorbitol, neopentyl glycol, glycerol, trimethylolpropane, 2,2,4,4-tetramethyl-1,3-cyclobutanediol, 3-methyl-1,5-pentanediol, 1,4-cyclohexanedimethanol, 1,3-cyclohexanedimethanol, bisphenol A ethoxylates, diethylene glycol, dipropylene glycol, triethylene glycol, 1,6-hexanediol, tripropylene glycol, tetraethylene glycol, polyethylene glycols having a number average molecular weight up to about 400 g/mol, block or random copolymers of ethylene oxide and propylene oxide, and mixtures thereof.

5. The process of claim 1 wherein the amount of dimer fatty acid used is 3 to 70 wt. % based on the amount of cycloaliphatic polyester polyol produced.

6. The process of claim 1 wherein the digested intermediate is reacted with the dimer fatty acid and a dibasic acid or an anhydride.

7. The process of claim 1 wherein the cycloaliphatic polyester polyol has a hydroxyl number within the range of 25 to 500 mg KOH/g.

8. The process of claim 1 wherein the molar ratio of glycol to thermoplastic polyester is within the range of 2.5 to 4.5.

9. The process of claim 1 wherein the thermoplastic polyester and glycol are heated in the presence of a catalyst.

10. The process of claim 1 wherein the thermoplastic polyester and glycol are heated at a temperature within the range of 80° C. to 260° C.

11. A cycloaliphatic polyester polyol made by the process of claim 1.

12. A polyurethane or polyisocyanurate made from the polyol of claim 11.

13. A mono- or poly(meth)acrylate made from the polyol of claim 11.

14. An aqueous polyurethane dispersion made from the polyol of claim 11.

15. A two-component polyurethane coating made from the polyol of claim 11.

16. A process for making a cycloaliphatic polyester polyol, comprising:
   (a) reacting a thermoplastic polyester, a glycol, and a dimer fatty acid to produce a modified polyol; and
   (b) hydrogenating aromatic rings in the modified polyol to produce the cycloaliphatic polyester polyol;
   wherein the amount of dimer fatty acid used is 3 to 70 wt. % based on the amount of cycloaliphatic polyester polyol produced, the molar ratio of glycol to thermoplastic polyester is at least 2.0, and the cycloaliphatic polyester polyol has a hydroxyl number within the range of 25 to 800 mg KOH/g.

17. A cycloaliphatic polyester polyol made by the process of claim 16.

18. A polyurethane or polyisocyanurate made from the polyol of claim 17.

19. A mono- or poly(meth)acrylate made from the polyol of claim 17.

20. An aqueous polyurethane dispersion made from the polyol of claim 17.

21. A two-component polyurethane coating made from the polyol of claim 17.

22. A process for making a cycloaliphatic polyester polyol, comprising:
   (a) heating virgin PET, recycled PET, or a mixture thereof with propylene glycol in the presence of a titanium catalyst to give a digested intermediate;
   (b) reacting the digested intermediate with a dimer fatty acid to produce a modified polyol; and
   (c) hydrogenating aromatic rings in the modified polyol to give the cycloaliphatic polyester polyol;
   wherein the molar ratio of propylene glycol to thermoplastic polyester is within the range of 2.5 to 4.5, the amount of dimer fatty acid used is 3 to 70 wt. % based on the amount of cycloaliphatic polyester polyol produced, and the cycloaliphatic polyester polyol has a hydroxyl number within the range of 25 to 800 mg KOH/g.

23. A cycloaliphatic polyester polyol made by the process of claim 22.

24. A polyurethane or polyisocyanurate made from the polyol of claim 23.

25. A mono- or poly(meth)acrylate made from the polyol of claim 23.

26. An aqueous polyurethane dispersion made from the polyol of claim 23.

27. A two-component polyurethane coating made from the polyol of claim 23.

* * * * *